2,998,089
AIR GAUGE WEIGHING DEVICE

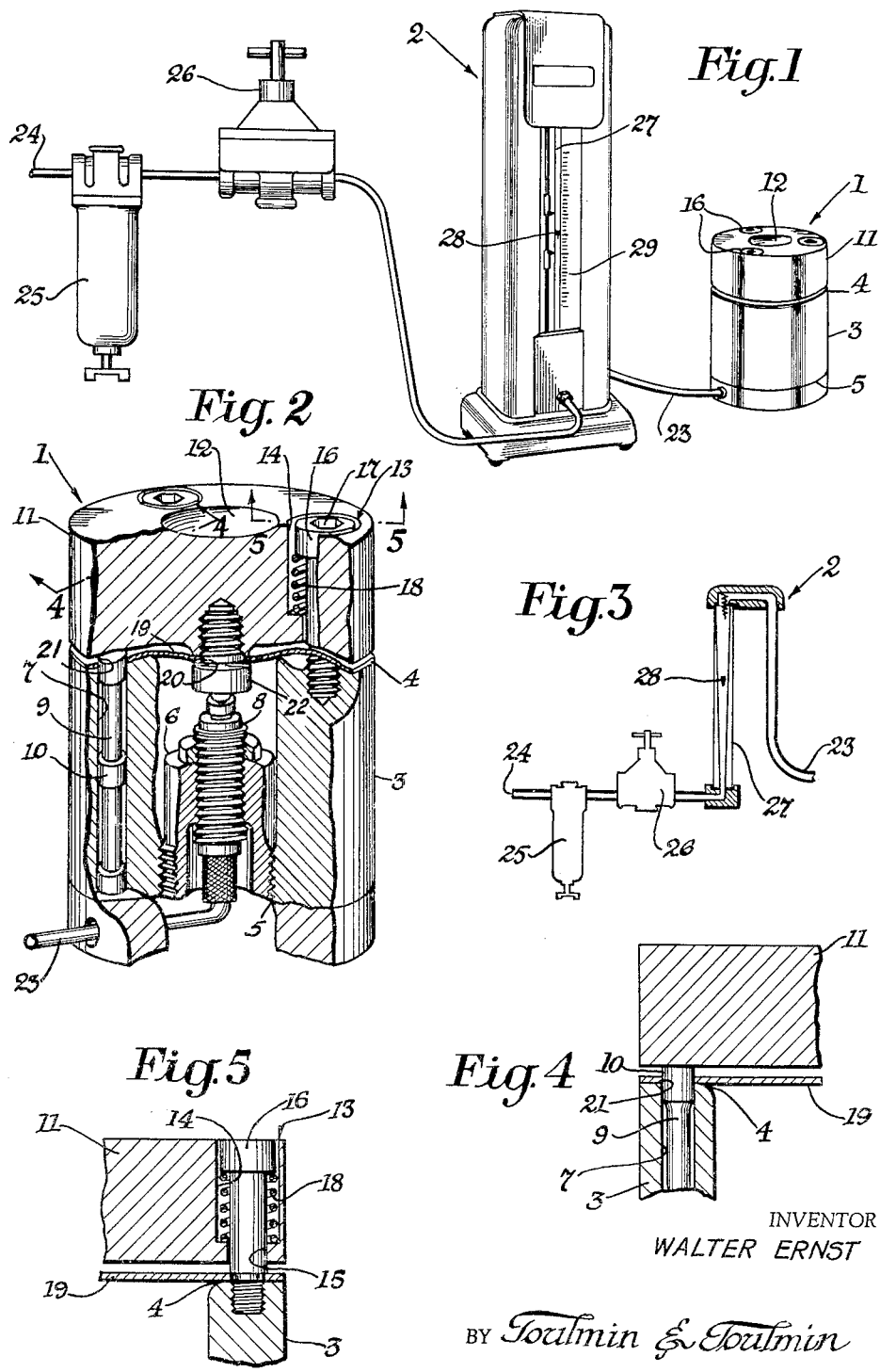
Aug. 29, 1961 — W. ERNST — 2,998,089
AIR GAUGE WEIGHING DEVICE
Filed Oct. 27, 1958
INVENTOR
WALTER ERNST
BY Toulmin & Toulmin
ATTORNEYS

United States Patent Office 2,998,089
Patented Aug. 29, 1961

Walter Ernst, Dayton, Ohio, assignor to The Commonwealth Engineering Company of Ohio, Dayton, Ohio
Filed Oct. 27, 1958, Ser. No. 769,740
7 Claims. (Cl. 177—208)

The present invention relates to an air flow weighing device, more particularly, to a highly accurate weighing device for batch and continuous weighing of large weights wherein the weight is supported upon a simple elastic structure and the deflection of the structure is measured by the modulation of flow through an air discharge orifice.

It is known that the elastic deflection of a stressed member under a given load may be utilized to determine the magnitude of the load. The deflection of the member is proportional to the load and the length of the stressed member, and inversely proportional to its area and the constant known as the modulus of elasticity. Since the modulus of most engineering materials is large, the deflection of the member is very small. Thus, the direct measurement of such small amounts of deflection is difficult, and direct measurements of any fractions thereof is virtually impossible. There is a need for some form of gain or amplification to be able to measure the effect of the loads.

Original developments in the field of weighing were directed towards increasing the gain at the output of the load itself. This led to the development of the spring scale. While spring scales have been built to great accuracy and considerable size, they have several disadvantages. Even with the greatest care in manufacture, it is not possible to insure absolute uniformity and linearity. Also, if any appreciable gain is used on the spring device, the energy that must be absorbed becomes inordinately large.

One apparent solution would be to put the gain into the indicating device, whose power level is low, rather than into the load output. Then the load would be resisted by a low gain device and the indication could be amplified. Before this system could be employed, however, it was necessary to develop high gain indication amplifiers.

In any kind of mechanical device such as an indicator, the amount of gain is limited, and added to this are the drawbacks of any mechanical device, namely, friction, wear and backlash. While the development of electronic amplification seemed to hold great promise, actual performance of electronic amplifying devices was disappointing. Difficulties had been experienced with instability, noise, zero shift, and failure to maintain calibration. Added to this were delicacy and complexity, which made the electronic device unsuited for production operations.

In order to overcome the above-mentioned drawbacks and to provide an accurate and dependable weighing device, it is proposed to provide a weighing device wherein the flow of air is measured to indicate the weight. It is thus possible to provide a weighing device which has a minimum of moving parts and in which the weight indicator in the form of the flow gauge has a complete absence of any form of mechanical wear. Further, the time lag of air flow gauges is so small that the response of such a system is almost instantaneous regardless of the dimensions. As a result, a weighing device can be constructed which can be used for both batch and continuous weighing.

It is therefore the principal object of this invention to provide a novel and improved weighing device.

It is another object of this invention to provide a weighing device using a weight-indicating means which has no form of mechanical wear and which has immediate response regardless of the dimensions of the system.

It is a further object of this invention to provide a weighing device having a minimum of moving parts.

It is an additional object of this invention to provide a weighing device especially suited for weights of two tons and over and which has a long life.

It is still another object of this invention to provide a strong, simplified weighing device which is not readily susceptible to malfunctioning or inaccuracies.

It is still a further object of this invention to provide a weighing device which can weigh vertical loads unaffected by any lateral components of such loads.

It is still an additional object of this invention to provide a novel and improved process of weighing large loads.

Additional objects and advantages of this invention will become readily apparent upon reference to the foregoing description and to the following drawings, wherein:

FIGURE 1 is an over-all perspective view of the weighing device of this invention showing both the weighing unit and the weight-indicating means;

FIGURE 2 is a perspective view of the weighing unit with portions thereof removed so as to show the manner in which the variable orifice is mounted;

FIGURE 3 is an elevational view of the flow gauge which indicates the weight;

FIGURE 4 is a sectional view taken along the lines 4—4 in FIGURE 2 and showing the weighing head supported upon the pins; and FIGURE 5 is a sectional view taken along the line 5—5 in FIGURE 2 showing the clamping screw and the spring which applies a preload to the weighing device.

The present invention essentially comprises a weighing unit and a weight-indicating unit in the form of an air flow gauge. The weighing unit comprises a weighing head supported upon an elastically deformable structure mounted in a base. A variable orifice is also mounted in the base so as to co-act with the weighing head so that the air flow discharged from the orifice is modulated by the weighing head. The air flow orifice is connected to a source of air under pressure through an air flow gauge. The air flow gauge indicates at any time the rate of flow of air through the system, including the variable orifice, and when read against a calibrated scale will indicate the load applied to the weighing unit.

To describe the invention in detail, reference is made to FIGURE 1, wherein like reference symbols indicate the same parts throughout the various views. The weighing device, as illustrated, comprises a weighing unit 1 and an air flow gauge 2. The weighing unit 1 comprises a base 3 which is cylindrical in shape and has a substantial wall thickness. The upper end of the base, as indicated at 4, is open, and the lower end of the base, indicated at 5, is closed by a plug or sleeve 6. There are a plurality of axial bores 7 opening on the top edge of the base 3.

A prefabricated variable orifice 8, such as is readily obtained in commerce, is threaded into the sleeve 6. This orifice will measure gaps from 0.001 inch (in.) to 0.080 in. and has a very great gain.

A pin 9 of an elastically deformable material is inserted into each one of the bores 7. These pins are accurately ground to diameter and length, and each has a plurality of enlarged portions 10 to maintain the pin in proper position in the bore. The pins in the weighing device of this invention are so ground that at the maximum rating of the weighing device they will compress 0.005 in. The pins extend slightly above the upper edge of the cylinder. Thus, when the weighing head to be later described rests upon the top edge of the base, the maximum weight will be reached and the device cannot be overloaded.

By varying the diameter of the pins, the rating of the weighing device may be varied within wide limits.

A weighing head 11 having a concave hollow recess 12 in the top surface thereof is supported on the projecting ends of the pins 9. There are a plurality of axial bores 13 spaced on the top surface of the weighing head adjacent the perimeter thereof. Each axial bore 13 passes completely through the weighing head and comprises a large-diameter bore 14 and a smaller-diameter bore 15. Clamping screws 16, each having a head 17 of the Allen type, are received in the bores 13 and have the lower end thereof threaded into tapped openings in the top edge of the cylindrical base. Springs 18 are positioned between the heads of the clamping screw 16 and the bottom of the large-diameter bores 14 so as to urge the weighing head against the pins and to preload the weighing device. This preloading will eliminate lost motion or a "dead" zone, when a load is placed upon the weighing head.

A thin metallic diaphragm 19 covers the upper end 4 of the cylindrical base. The diaphragm has a center opening 20 and a plurality of spaced holes 21 adjacent the periphery thereof. The holes 21 alternately accommodate the pins 9 and the clamping screws 16. The clamping screws 16, as may be seen in FIGURE 5, secure the diaphragm to the top edge of the base 3. The pins 9, however, are free to slide in the holes in the diaphragm.

Since it is not always possible to locate the weight precisely in a vertical line with the weighing device, horizontal components of this weight are frequently encountered. The diaphragm 19, which has virtually no resistance to vertical deflection, has been provided to absorb such lateral force components without creating friction and introducing inaccuracies.

There is a solid plug 22 which passes through the central opening 20 of the diaphragm 19 and is threadedly received in the bottom face of the weighing head 11. This plug 22 both secures the diaphragm to the weighing head and co-acts with the variable orifice so as to modulate the flow of air discharged from the orifice.

A tube or conduit 23 connects the variable orifice with the air flow gauge 2. The air flow gauge 2 is connected to a source of air under pressure as indicated at 24, and comprises a filter 25, a regulator 26, and a developed glass tube 27 which has an internal taper therein as can be seen in FIGURE 3. Inside the glass tube 27 there floats an indicator 28 whose position is directly proportional to the rate of air flow through the system. A scale 29 is positioned adjacent the developed glass tube, and the particular scale illustrated is 5 in. in length.

The operation of the flow gauge system depends on the rate of mass flow being the same at all points of the system, and consequently the velocity at every point in the system is proportional to the effective nozzle cross-section. This system is essentially a comparator, and masters must be used to calibrate the gauge.

In the weighing device of this invention a total deflection of 0.005 in. from 0 to maximum weight is used. This deflection, when shown upon the 5 in. scale 29, will result in a gain of 1000 to 1. Since the gauge is responsive to and can be read to increments of $\frac{1}{20}$ in. or 1% of scale reading, it is possible to weigh heavy weights within 1% of full load. Intermediate weight ranges could be measured with greater accuracy since variable orifices are now available which have a gain of as much as 5000 to 1.

The proposed weighing device is particularly suitable for determining heavy weights. It is extremely light and compact and rugged in construction. One and the same unit will cover a very wide range merely by changing pins and by changing the gain on the measuring device.

The weighing device is not an absolute measuring device for displacement and for weight. Dual calibration is required prior to using the weighing device. The column formed by the glass tube 27 must be calibrated for the distance between the variable orifice and the plug 22. This distance must then be related to the weight. The distance calibration is made by master gauges whereby the total structure of the variable orifice (0.005 in.) is represented by the maximum 5 in. column scale. This is done by adjusting the gain and the scale location on the instrument.

After the variable orifice has been reinstalled and its initial position adjusted to 0 on the glass tube, the weighing device is calibrated for weight on a testing machine. Due to its rugged nature, the weighing device will maintain calibration for long periods of time. The air column calibration may be checked from time to time through a gauging hole provided for this purpose.

Thus, in using the weighing device of this invention, the load is applied to the weighing head, and the weighing head will immediately deflect the pins. This deflection will modulate the flow of air being discharged from the variable orifice. The modulation in the air flow will cause a repositioning of the indicator 28 which is floating in the column of air passing upwardly through the glass tube 27. By reading the indicator against the calibrated weights on the scale 29, the weight of the load is readily ascertained.

The weighing device of this invention has numerous applications in both batch and continuous weighing. The device can be readily used for track scales, truck weighing, crane scales for weights running into many tons and of small compact size. Since electricity is not employed, this weighing device is ideal for explosion-hazardous locations.

For continuous weighing and automatic weight control, standard electric gauge heads are available that can be used to control accurate conveying of bulk materials with small compact apparatus of minimum size, and within close limits.

Thus it can be seen that the present invention has disclosed a weighing unit which utilizes the flow of air to measure vertical loads. The weighing unit is simple in construction, easy to operate, and has a minimum of movable parts so as not to be susceptible to inaccuracies.

It will be understood that this invention is susceptible to modification in order to adapt it to different usages and conditions, and, accordingly, it is desired to comprehend such modifications within this invention as may fall within the scope of the appended claims.

What I claim is:

1. In a weighing device, a base, said base having an open end, a diaphragm closing the open end of said base, a plurality of axial bores in said base, elastically deformable pins mounted in said axial bores of said base, a weighing head supported by said elastically deformable pins above said base, means carried by said weighing head for preloading the weighing device to eliminate lost motion when a load is applied to the weighing head, a variable orifice mounted on said base so that the orifice is varied by the movement of the weghing head, a source of air flow to said variable orifice, and means to measure said air flow as varied by the movement of said weighing head.

2. In a weighing device, an upright cylinder forming a base, the lower end of said base being closed and the upper end of said base being open, a diaphragm closing the open end of said base, there being a plurality of axial bores spaced in the upper end of said cylindrical base, elastically deformable pins received in said bores and projecting slightly above the top edge of said base, a weighing head supported upon the projecting ends of said pins, a variable orifice mounted on the closed end of said base to co-act with said weighing head, a source of air flow to said variable orifice, and means to measure said air flow as varied by the movement of said weighing head with respect to said variable orifice.

3. In a weighing device, an upright cylinder forming a base, the lower end of said base being closed and the upper end of said base being open, a thin metallic diaphragm closing the open end of said cylindrical base, there being a plurality of axial bores spaced in the upper edge of said base, elastically deformable pins received in said bores and projecting slightly above the top edge of said base, a weighing head supported upon the projecting ends of said pins, a variable orifice mounted on the closed end of said base to co-act with said weighing head, means carried by said weighing head and diaphragm and engageable with said variable orifice to operate the same, a source of air flow to said variable orifice, and means to measure said air flow as varied by the movement of said weighing head with respect to said variable orifice.

4. In a weighing device, a base, said base having an open end, a diaphragm closing the open end of said base, a plurality of axial bores in said base, a plurality of elastically deformable pins mounted in said axial bores in said base, a weighing head supported upon said pins, clamp screws securing said head to said base upon said pins, a spring carried by said weighing head between the head of each clamp screw and a portion of said weighing head to place a preload on the weighing device, a variable orifice co-acting with said variable head, a source of air flow to said variable orifice, and means to measure said air flow as varied by the movement of said weighing head with respect to said variable orifice.

5. In a weighing device, an upright cylinder forming a base, the lower end of said base being closed and the upper end of said base being open, a diaphragm closing the open end of said cylindrical base, there being a plurality of axial bores spaced in the upper edge of said base, elastically deformable pins received in said bores and projecting slightly above the top edge of said base, a weighing head supported upon the projecting ends of said pins, clamp screws attaching said head to the upper end of said cylindrical base and maintaining said diaphragm in position on said base, springs between the head of each clamp screw and a portion of said weighing head to urge said weighing head against said pins to place a preload on the weighing device, a variable orifice mounted on the closed end of said base to co-act with said weighing head, means carried by said weighing head and diaphragm and engageable with said variable orifice to operate the same, a source of air flow to said variable orifice, and means to measure said air flow as varied by the movement of said weighing head with respect to said variable orifice.

6. In a weighing device, a base, said base having an open end, a diaphragm closing the open end of said base, a plurality of axial bores in said base, elastically deformable pins mounted in said axial bores of said base, a weighing head supported by said elastically deformable pins above said base, resilient means on said weighing head to urge said weighing head against said elastically deformable means to preload the weighing device, a variable orifice mounted on said base so that the orifice is varied by the movement of the weighing head, a source of air flow to said variable orifice, and means to measure said air flow as varied by the movement of said weighing head.

7. A weighing device comprising an upright cylinder forming a base with the upper end being open and the lower end being closed, a thin metallic diaphragm closing the open end of said cylinder, there being a plurality of axial bores in the upper edge of said upright cylinder, elastically deformable pins received within said bores and projecting slightly above the top edge of said cylinder, said pins extending such a distance above the surface of the cylinder so as to be flush with the top edge of the cylinder when the maximum load of the weighing device is reached whereby the weight device cannot be overloaded, a weighing head supported on the projecting ends of said pins, clamp screws attaching said weighing head to the top edge of said cylindrical base, springs between the head of each clamp screw and a portion of said weighing head to urge said weighing head against the deformable pins so as to preload the weighing device, a variable orifice mounted on the closed end of said cylindrical base spaced from the lower face of said weighing head, the range of movement between said variable orifice and said weighing head corresponding to the space between said weighing head and the top edge of the base at no load, a source of air flow for said variable orifice, and means to measure said air flow as varied by the movement of said weighing head.

References Cited in the file of this patent

UNITED STATES PATENTS

| | | |
|---|---|---|
| 2,451,451 | Tate | Oct. 12, 1948 |
| 2,497,236 | Polk | Feb. 14, 1950 |
| 2,755,057 | Knobel | July 17, 1956 |
| 2,775,887 | Hines | Jan. 1, 1957 |
| 2,830,803 | Doyle | Apr. 15, 1958 |
| 2,837,620 | MacDonald et al. | June 3, 1958 |
| 2,855,489 | Ruge | Oct. 7, 1958 |
| 2,875,611 | Whitney | Mar. 3, 1959 |